United States Patent [19]

Tanaka et al.

[11] 4,192,928
[45] Mar. 11, 1980

[54] THERMOPLASTIC POLYURETHANE AND PROCESS FOR THE PREPARATION THEREOF

[75] Inventors: Atsushi Tanaka, Iwakuni; Toshihiko Shinoda; Masahisa Mimura, both of Mihara, all of Japan

[73] Assignee: Teijin Limited, Osaka, Japan

[21] Appl. No.: 28,288

[22] Filed: Apr. 9, 1979

Related U.S. Application Data

[63] Continuation of Ser. No. 861,088, Dec. 15, 1977, abandoned.

[30] Foreign Application Priority Data

Dec. 30, 1976 [JP] Japan .................... 51-159807
Mar. 23, 1977 [JP] Japan .................... 52-31122

[51] Int. Cl.$^2$ ............... C08G 18/14; C08G 18/32; C08G 18/65
[52] U.S. Cl. ............... 521/177; 427/246; 428/310; 428/320; 521/163; 521/164; 528/79; 528/906; 528/902
[58] Field of Search .................. 521/163, 164, 177

[56] References Cited

U.S. PATENT DOCUMENTS

| | | | |
|---|---|---|---|
| 3,078,257 | 2/1963 | Rinke et al. | 260/47 CB |
| 3,250,745 | 5/1966 | Davis et al. | 260/47 CB |
| 3,436,361 | 4/1969 | Wooster | 260/47 CB |
| 3,457,225 | 7/1969 | Damusis | 260/47 CB |
| 3,575,896 | 4/1971 | Khan | 521/177 |
| 3,577,385 | 5/1971 | Feltzin et al. | 260/47 CB |
| 3,594,352 | 7/1971 | Lloyd et al. | 260/47 CB |
| 3,679,631 | 7/1972 | Mayes | 260/47 CB |
| 3,681,291 | 8/1972 | Khan | 260/77.5 AQ |
| 3,817,918 | 6/1974 | Aufdermarsh | 260/77.5 AM |
| 3,895,134 | 7/1975 | Kigave et al. | 260/2.5 AY |
| 3,920,588 | 11/1975 | Traubel et al. | 521/163 |
| 4,000,218 | 12/1976 | Critchfield et al. | 260/77.5 AM |
| 4,125,693 | 11/1978 | Hilterhaus | 521/163 |

OTHER PUBLICATIONS

Japanese Patent Appl. Laid-Open No. 51533/75 Morita et al.
Japanese Patent Appl. Publication No. 22053/75 Shirota et al.

*Primary Examiner*—H. S. Cockeram
*Attorney, Agent, or Firm*—Sughrue, Rothwell, Mion, Zinn and Macpeak

[57] ABSTRACT

A thermoplastic polyurethane comprising the polymerization product of a long-chain diol, a low molecular weight chain-extender, an organic diisocyanate and a specific diol compound. The specific diol compound is represented by the following formula:

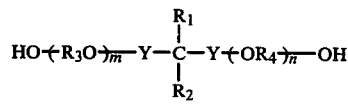

wherein $R_1$ and $R_2$ are hydrogen or an alkyl radical having from 1 to 3 carbon atoms, $R_3$ and $R_4$ are an alkylene radical having from 2 to 4 carbon atoms, Y is a bivalent radical selected from the group consisting of

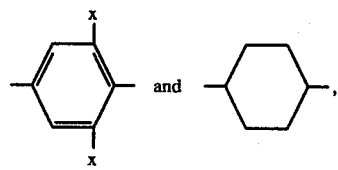

wherein x is hydrogen, chlorine, bromine or a methyl radical, m and n are positive integers satisfying the formula $2 \leq m+n \leq 10$
when Y is

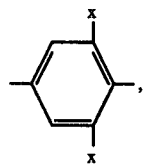

or m and n are zero or positive intergers satisfying the formula $0 \leq m+n \leq 10$
when Y is

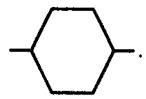

The thermoplastic polyurethanes are suitable for producing artificial leathers having improved properties such as moderate elasticity, resistance to microorganisms, cold, stickiness and nitrogen oxide gas.

17 Claims, No Drawings

THERMOPLASTIC POLYURETHANE AND PROCESS FOR THE PREPARATION THEREOF

This is a continuation of application Ser. No. 861,088, filed Dec. 15, 1977, now abandoned.

BACKGROUND OF THE INVENTION

1. Field of the Invention

This invention relates to an improved thermoplastic polyurethane and to a process for the preparation thereof. More particularly, this invention is concerned with a thermoplastic polyurethane suitable for producing artificial leathers having improved properties such as moderate elasticity, resistance to microorganisms, cold, stickiness and nitrogen oxide gas, and with a process for producing the same.

2. Description of the Prior Art

Heretofore, artificial leathers consisting mainly of a non-woven, woven or knitted fabric and an elastic polymer have been made as a substitute for natural leather. The mechanical and physical properties, as well as the practical durability, of these artificial leathers depend upon not only the kind(s) of fibers comprising the fabric, the structure of the non-woven fabric and the physical properties of the woven or knitted fabric, but also depend greatly upon the properties of the elastic polymer.

In order to make an artificial leather having various desirable properties, therefore, it is necessary to use an appropriate elastic polymer.

As one such elastic polymer, polyurethanes have been used which consist of a soft segment of a long-chain diol such as a polyester diol or a polyether diol, and a hard segment derived from a low-molecular-weight diol such as ethylene glycol, propylene glycol or 1,4-butanediol, or a diamine such as ethylene diamine or 1,2-propylene diamine, and an organic diisocyanate.

Such polyurethanes have excellent flexibility, bending durability, abrasion resistance, toughness and resistance to chemicals, and hence are widely used for artificial leathers. These polyurethanes, however, have disadvantages:

(1) Since these polyurethanes have too high elasticity, an artificial leather prepared using these polyurethanes has an elasticity similar to rubber, and does not exhibit a natural leather touch.

(2) Since the resistance to microorganisms of these polyurethanes is poor, the durability of an article obtained using these polyurethanes is not good enough to provide an article suitable for practical use. For example, the surface of shoes prepared therefrom will crack when worn for a long time.

(3) Since these polyurethanes have high stickiness and a high frictional coefficient, the touch or feel of an artificial leather obtained therefrom is not good when they are used as a surface finishing polymer for an artificial leather.

(4) These polyurethanes have poor resistance to cold and tend to be yellowed by a gas such as nitrogen oxide gas.

As described above, these known polyurethanes which consist of a soft segment of a long-chain diol and a hard segment derived from a low-molecular-weight diol or a diamine and an organic diisocyanate are not necessarily suitable for artificial leathers. Methods have been proposed to avoid the disadvantages of these known polyurethanes, which methods comprise adding a third component to such known polyurethanes to improve the basic properties of these polyurethanes.

Japanese Patent Application Laid-Open No. 51533/75, Morita et al, published May 8, 1975, discloses a polyurethane composition having improved stickiness which contains a polar, organic fluorine compound.

Japanese Patent Application Publication No. 22053/75, Shirota et al, published July 28, 1975, discloses a polyurethane composition having improved stickiness which contains isophthalic acid or terephthalic acid components in the polyurethane molecule, which can be used for preparing an artificial leather having a good feel. However, these polyurethane compositions do not have other good properties such as moderate elasticity or resistance to microorganisms, cold, and nitrogen oxide gas which are necessary in polyurethanes used to prepare excellent artificial leathers.

U.S. Pat. No. 3,681,291, Khan, issued August 1, 1972, discloses a liquid castable urethane composition consisting of the reaction product of: (I) a prepolymer obtained by reacting a diisocyanate with a polyol such as polyoxypropylene polyol with (II) a curing composition comprising (a) a polyol such as polyoxypropylene polyol, (b) an aromatic diol such as an adduct of bisphenol A and propylene oxide, (c) an aromatic amine corresponding to the formula

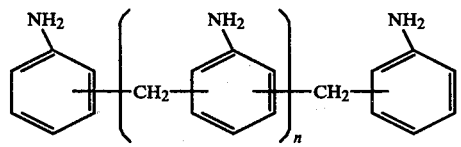

wherein n represents a value between 0.1 and 0.3 and (d) an organometallic catalyst. Since this urethane composition contains an aromatic amine having more than two active hydrogens as a curing agent, the polyurethane obtained has a very high molecular weight and high strength, and is insoluble in organic solvents. Although this polyurethane is suitable for motor mounts, vibration dampers, oil seals, gaskets, fuel hose and machine pads, it is not useful for artificial leathers.

SUMMARY OF THE INVENTION

It has now been found that if a derivative of an aromatic diol, such as biphenol A, or an alicyclic diol, such as bis(4-hydroxycyclohexyl)methane, or a derivative of an alicyclic diol is used as a third component in the process for the preparation of the above described polyurethanes which consist of a soft segment of a long-chain diol and a hard segment derived from a low-molecular-weight diol or a diamine and an organic diisocyanate, the above-mentioned disadvantage of the prior art can be substantially overcome.

It is, therefore, one object of the present invention to provide a thermoplastic polyurethane suitable for producing artificial leathers having improved properties such as moderate elasticity and resistance to microorganisms, cold, stickiness and nitrogen oxide gas.

It is another object of the present invention to provide a process for the preparation of the above thermoplastic polyurethane.

The above-mentioned objects are attained by the thermoplastic polyurethane in accordance with the present invention, which comprises the polymerization product of:

(A) a long-chain diol having a molecular weight of from about 800 to about 4,000;
(B) a difunctional active hydrogen-containing chain-extender having a molecular weight of from about 50 to about 150;
(C) an organic diisocyanate, and
(D) a diol compound represented by the following formula (I):

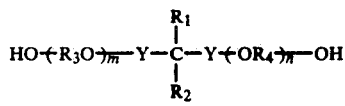

wherein $R_1$ and $R_2$ may be the same or different and are hydrogen or an alkyl radical having from 1 to 3 carbon atoms, $R_3$ and $R_4$ may be the same or different and are an alkylene radical having from 2 to 4 carbon atoms, Y is a bivalent radical selected from the group consisting of

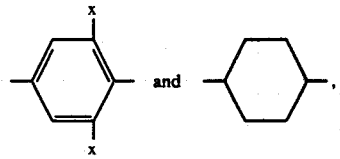

wherein x is hydrogen, chlorine, bromine or a methyl radical, m and n are positive integers satisfying the formula $2 \leq m+n \leq 10$ when Y is

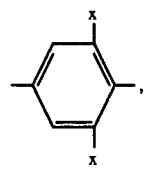

or m and n are zero or positive integers satisfying the formula $0 \leq m+n \leq 10$ when Y is

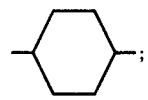

wherein component (D) comprises from about 3% to about 15% by weight of the polyurethane, and the nitrogen atoms derived from component (C) comprise from about 3% to about 6% by weight of the polyurethane.

The process for the preparation of the thermoplastic polyurethane is characterized by reacting the (A), (B), (C) and (D) components where the weight ratio of the (total of the (A), (B) and (C) components):((D) component) is from 97:3 to 85:15, wherein the amount of component (C) is such as to provide nitrogen atom content derived from component (C) of from about 3% to about 6% by weight of the polyurethane and wherein component (D) is such that the pH of an aqueous solution containing 1% by weight of the component (D) is from about 5.0 to about 7.5 at room temperature.

DESCRIPTION OF THE PREFERRED EMBODIMENTS

The diol compounds (compound (D)) employed in the present invention include: (1) adducts of aromatic diols and alkylene oxides satisfying the formula $2 \leq m+n \leq 10$, (2) alicyclic diols (m+n=0) and (3) adducts of alicyclic diols and alkylene oxides satisfying the formula $1 \leq m+n \leq 10$.

As aromatic diols, there can be exemplified bis(4-hydroxyphenyl)methane, 2,2-bis(4-hydroxyphenyl)propane(bisphenol A), 2,2-bis(4-hydroxyphenyl)butane, 3,3-bis(4-hydroxyphenyl)pentane, bis(4-hydroxy-3,5-dimethylphenyl)methane, 2,2-bis(4-hydroxy-3,5-dimethylphenyl)propane, 2,2-bis(4-hydroxy-3,5-dimethylphenyl)butane, 3,3-bis(4-hydroxy-3,5-dimethylphenyl)pentane, bis(4-hydroxy-3,5-dibromophenyl)methane, 2,2-bis(4-hydroxy-3,5-dibromophenyl)propane, 2,2-bis(4-hydroxy-3,5-dibromophenyl)butane and 3,3-bis(4-hydroxy-3,5-dibromophenyl)pentane.

As alicyclic diols, there can be exemplified bis(4-hydroxycyclohexyl)methane, 2,2-bis(4-hydroxycyclohexyl)propane and 3,3-bis(4-hydroxycyclohexyl)pentane.

As alkylene oxides, there can be exemplified ethylene oxide, propylene oxide and butylene oxide.

Among these diol compounds, the diol compounds represented by the following formula (II) are preferred:

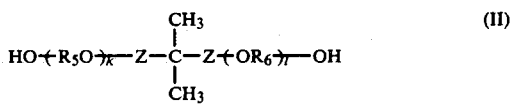

In formula (II), $R_5$ and $R_6$ are the same and are a member selected from the group consisting of $-CH_2.CH_2-$ and

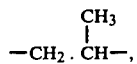

Z is a member selected from the group cosnsisting of

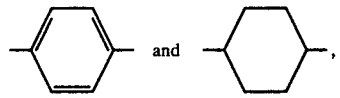

k and l are 1 or 2 when Z is

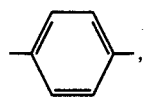

and k or l are 0, 1 or 2 when Z is

The diol compound (component (D)) in the present invention comprises from about 3% to about 15% by weight of the obtained polyurethane. When the amount of the diol compound is less than about 3% by weight, the obtained polyurethane does not have excellent properties such as moderate elasticity, resistance to microorganisms, cold, stickiness and nitrogen oxide gas. On the other hand, when the amount of the diol compound is more than about 15% by weight, the obtained polyurethane has too high an elastic modulus, and hence is not suitable for artificial leathers.

The long-chain diols having a molecular weight of from about 800 to about 4,000 include conventional polyester diols and polyether diols.

As useful polyester diols, there can be exemplified polyester glycols which are obtained by reacting an aliphatic dicarboxylic acid, such as succinic acid, adipic acid, sebacic acid and azelaic acid, or a lower alkyl (1–4 carbon atoms) ester of the aliphatic dicarboxylic acid, with an aliphatic glycol, such as ethylene glycol, 1,2-propylene glycol, tetramethylene glycol, hexamethylene glycol, diethylene glycol, neopentyl glycol or a mixture thereof and polyester diols which are obtained by the ring-opening-polymerization of lactones such as ε-caprolactone. In the polyester diols of the present invention, a part (less than 20 mol %) of the aliphatic dicarboxylic acid may be replaced by an aromatic or alicyclic dicarboxylic acid.

As useful polyether diols, there can be exemplified polyalkyleneether glycols, such as polyethyleneether glycol, polypropyleneether glycol, polytetramethyleneether glycol and polyhexamethyleneether glycol; copolymerized polyether diols such as polyethylenepropyleneether glycol; and block copolymerized polyether diols such as polyethyleneether-polytetramethyleneether block copolymer.

In the present invention, it is possible to use any one of the above-mentioned long-chain diols or a mixture thereof. Nevertheless, a mixture of the long-chain diols is preferably used to obtain a polyurethane having special properties. When a mixture of from about 90% to about 30% by weight of one or more polyester diols and from about 10% to about 70% by weight of one or more polyether diols is used, in particular, it is possible to obtain a polyurethane having excellent resistance to microorganisms. When a long-chain diol containing more than about 70% by weight of one or more polyether diols is used, in particular, it is possible to obtain a polyurethane having excellent resistance to cold.

The organic diisocyanates used in the present invention include aliphatic, alicyclic and aromatic diisocyanates or mixtures thereof. Such diisocyanates include, for example, hexamethylene diisocyanate, trimethylhexamethylene diisocyanate, isophorone diisocyanate, dicyclohexylmethane-4,4'-diisocyanate, tolylene-2,4-diisocyanate, m-phenylene diisocyanate, p-phenylene diisocyanate, diphenylmethane-4,4'-diisocyanate, naphthalene-1,5-diisocyanate, diphenyl diisocyanate and p-xylylene diisocyanate.

Among these organic diisocyanates, diphenylmethane-4,4'-diisocyanate, p-phenylene diisocyanate, p-xylylene diisocyanate and a mixture thereof are preferred. Diphenylmethane-4,4'-diisocyanate is particularly preferred.

In the present invention, the amount of nitrogen atoms derived from the organic diisocyanate comprises from about 3% to about 6% by weight of the obtained polyurethane. When the amount of nitrogen atoms is less than about 3% by weight, the obtained polyurethane has too low an elastic modulus, and hence is not suitable for obtaining artificial leathers having leathery suppleness. On the other hand when the amount of nitrogen atom is more than about 6% by weight, the obtained polyurethane has too high an elastic modulus, and hence is not suitable for obtaining aritifical leathers having a leathery soft touch.

Especially, when the amount of nitrogen atoms comprises from 4.7% to about 6.0% by weight of the obtained polyurethane, the obtained polyurethane has excellent resistance to organic solvents and stickiness as well as a low frictional coefficient. These polyurethanes overcome various problems in the manufacturing process for artificial leathers, e.g., they are not subject to the disadvantage of foreign matter, such as fibrous waste, adhering to the surface of the artificial leather during surface finishing processing.

In the process invention, the difunctional active hydrogen-containing chain-extenders having a molecular weight of from about 50 to about 150 include diols, such as ethylene glycol, propylene glycol, 1,4-butane diol and 1,6-hexane diol; diamines, such as ethylene diamine, 1,2-propylene diamine, 1,4-butylene diamine, hexamethylene diamine, cyclohexane diamine and xylylene diamine; alkanol amines, such as ethanol amine and aminopropyl alcohol; hydrazine; and carbodihydrazides. Among these chain-extenders, diols are preferred because process control is easy.

The polyurethane of the present invention has a molecular weight of from about 30,000 to about 300,000, preferably from about 40,000 to about 100,000.

The polyurethane of the present invention may contain therein a coloring agent, such as carbon black, other pigments and dyestuffs, a thermal or light stabilizer, or an antioxidant.

The polyurethanes of the present invention, which have a tensile stress at 5% elongation of from 0.1 to 0.5 kg/mm$^2$, a tensile stress at 20% elongation of from 0.2 to 1.0 kg/mm$^2$ and an elongation recovery at 50% elongation of from 50% to 87% at a temperature of 20° C., as measured in the form of a polyurethane film, are, in particular, suitable for producing a porous layer or a base layer of an artificial leather. The polyurethanes of the present invention, which have a tensile stress at 5% elongation of from 0.6 to 3.0 kg/mm$^2$ are, in particular, suitable for producing a surface finishing layer of an artificial leather.

The thermoplastic polyurethanes in the present invention are obtained by reacting: (A) a long-chain diol having a molecular weight of from about 800 to about 4,000; (B) a difunctional active hydrogen-containing chain-extender having a molecular weight of from about 50 to about 150; (C) an organic diisocyanate; and (D) a diol compound represented by the above formula (I), the pH of an aqueous solution containing 1% by weight of the diol compound being from about 5.0 to about 7.5 at room temperature, at a weight ratio of the total of the ((A), (B) and (C) components):(component (D)) being from 97((A)+(B)+(C)):3((D) to 85((A)+(B)+(C)):15((D)), and the amount of component (C) being such as to provide a nitrogen atom content derived from component (C) of from about 3% to about 6% by weight of the obtained polyurethane.

In the present invention, compound (D) has a quality of purity such that the pH of an aqueous solution containing 1% by weight of compound (D) is from about 5.0 to about 7.5 at room temperature (about 20° C.). The pH is measured as follows: A mixture of 1 g of compound (D) and 99 g of pure water is heated while stirring and boiled for 5 minutes, and is then cooled while stirring to room temperature (about 20° C.). After removing precipitated foreign matter from the obtained solution by filtration using filter paper, the pH of the filtrate is measured using a glass electrode in JIS-Z-8802-7 at room temperature.

By using compound (D) having a pH of from about 5.0 to about 7.5, a straight-chain polyurethane is dominantly obtained rather than a polyurethane having branched chains. When the pH of compound (D) is more than about 7.5, the obtained polyurethane tends to have too high a viscosity because of side reactions, and hence does not have good workability. When the pH of compound (D) is less than about 5.0, a polyurethane having a high molecular weight cannot be obtained because the rate of polymerization is lowered.

In the present invention, it is preferred to use compounds (A), (B) and (D) at a molar ratio of from about 1.5 to about 3.0 mols of compound (B) per 1 mol of the total of the compounds (A) and (D).

The preparation of the thermoplastic polyurethane in the present invention can be effected by any of the following methods.

(1) An one-shot method wherein a long-chain diol (component (A)), a chain-extender (component (B)) an organic diisocyanate (component (C)), and a diol compound (component (D)) are reacted at the same time.

(2) A two stage method wherein a prepolymer is formed by reacting a long-chain diol (component (A)) and a diol compound (component (D)) with an organic diisocyanate (component (C)), and thereafter the resulting prepolymer is reacted with a chain-extender (component (B)) to obtain a high-molecular weight polyurethane.

(3) A two stage method wherein a prepolymer is formed by reacting a long-chain diol (component (A)) with an organic diisocyanate (component (C)), and thereafter the resulting prepolymer is reacted with a chain-extender (component (B)) and a diol compound (component (D)) to obtain a high-molecular-weight polyurethane.

Two stage methods (2) or (3) are preferred in the present invention, with two stage method (2) being especially preferred.

The above-described reaction can be effected by any of the following methods.

(1) A melt polymerization wherein the materials are reacted in a molten state.

(2) A solution polymerization wherein the materials are reacted in an organic solvent, such as dimethylformamide, dimethylacetamide and dimethyl sulfoxide.

(3) A slurry polymerization wherein the materials are reacted in a poor organic solvent for the polyurethane to obtain the polyurthane in a slurry state. (The method is disclosed in U.S. Pat. No. 3,895,134, Kigane et al, issued July 15, 1975.)

The slurry polymerization is preferred to obtain a polyurethane suitable for preparing a good microporous sheet for artificial leathers. The slurry of the polyurethane contains particles of polyurethane, and forms a good microporous polyurethane sheet when coagulated in a substrate of an artificial leather.

The organic solvent used in the slurry polymerization is preferably selected in accordance with the polyurethane compositions to prepare a desired polyurethane slurry. As useful organic solvents, there can be exemplified ketones, such as acetone, methyl ethyl ketone and methyl isobutyl ketone; esters, such as ethyl formate, ethyl acetate, butyl formate and butyl acetate; hydrocarbon halides, such as carbon tetrachloride, chloroform, dichloroethane and trichloroethane; aromatic hydrocarbons, such as benzene, toluene and xylene; and cyclic ethers, such as tetrahydrofuran and dioxane, all of which are poor solvents for the polyurethanes.

In the present invention, there can be also used a mixed solvent of any of the above-mentioned poor solvents and a good solvent for the polyurethane, such as dimethylformamide, dimethylacetamide, N-methyl pyrrolidone and dimethyl sulfoxide.

In order to obtain a polyurethane slurry having good workability and permeability in a substrate for forming a microporous smooth surface of an artificial leather, it is preferred that the size of the particles of the polyurethane in the polyurethane slurry be as small as possible. The average diameter of the articles preferably does not exceed about $30\mu$, and most preferably, does not exceed $20\mu$.

The amount of the particles of polyurethane is usually from about 10% to about 75%, preferably from 10% to 60% by weight, based on the total weight of the polyurethane contained in the polyurethane slurry. When the diol compound (component (D)) of the present invention is used to prepare the polyurethane, the polyurethane slurry having the above-described properties is easily obtained.

Methods for preparing a microporous sheet for artificial leathers from a polyurethane of the present invention include a wet method which comprises coating or impregnating a substrate such as a film or non-woven fabric with a polyurethane solution or slurry, immersing the substrate in a coagulating liquid, such as water, methanol, ethanol or propanol, which is a non-solvent for the polyurethane and is miscible with the solvent used, and coagulating the polyurethane to thereby form a microporous sheet; a dry method which comprises coating or impregnating a substrate such as a film or non-woven fabric with a polyurethane solution or slurry, and drying the substrate to evaporate the solvent used in a humid atmosphere. In a dry method using a polyurethane slurry, an organic solvent having a boiling point of not more than about 120° C., preferably not more than 100° C., and having a solubility at 25° C. in the organic solvent of from 1 to 50 g per 100 g of the organic solvent used is preferred.

As solvents satisfying the above-criteria, there can be exemplified methyl ethyl ketone, diethyl ketone, methyl isobutyl ketone, ethyl formate, butyl formate and a mixed solvent of not more than about 50% by weight of tetrahydrofuran or dioxane and any of the above-mentioned solvents.

According to the present invention, it is possible to provide a thermoplastic polyurethane suitable for preparing artificial leathers having various properties similar to natural leather.

The present invention is more specifically illustrated in the following examples. MW in the examples means number average molecular weight. The various physical properties mentioned in the examples were determined as follows:

1. Tensile Stresses at 5% and 20% Elongations, Elongation Recovery at 50% Elongation The polyurethane obtained in accordance with the present invention was dissolved in dimethylformamide (DMF) to form a DMF solution containing 10% by weight of the polyurethane. A 150 micron thick film of the polyurethane was prepared by coating the solution on a glass plate and drying the glass plate with the film thereon at 70° C. for 24 hours. The film stripped from the plate was then dried at 80° C. for 2 hours at a reduced pressure of 10 mmHg.

A test piece having a length of 9 cm and a width of 1 cm was cut out from the film and was drawn out at a rate of 100% per minute (50 mm/minute) at a temperature of 20° C. using an Elongation Test Machine. (2 cm of each end of the test piece was held by the Machine.) The tensile stress at 5% or 20% elongation was calculated by dividing the weight of the load at 5% or 20% elongation by the original cross-sectional area of the piece, respectively.

The elongation recovery at 50% elongation is a percent value which was calculated by dividing the recovered elongation after removing the load at 50% elongation by the 50% elongation.

2. Strength at Breakage of Polyurethane Film After Raying for 48 Hours (kg/mm²)

The strength at breakage of the test piece of the polyurethane film obtained as shown in Test 1 was measured using an Elongation Test Machine after exposing the film to a carbon arc light for 48 hours in a fade-O-meter. The preferred strength at breakage is more than 2 kg/mm².

3. Frictional Coefficient of Polyurethane Film ($\mu$)

A test piece having a length of 4 cm and a width of 2.5 cm was cut out from a polyurethane film obtained as described for Test 1. The test piece was placed on a smooth surface of a stainless steel plate and a load (W) of 500 g/10 cm² applied. The force (F) needed to draw the test piece at a rate of 1 m/minute at 20° C. was measured. Th frictional coefficient ($\mu$) was calculated by the following formula:

$$\mu = F/W$$

The preferred frictional coefficient is from 0.3 to 0.85 for a polyurethane used for a porous layer or base layer, and is less than 0.3 for a polyurethane used for a surface finishing layer.

4. Resistance to Organic Solvents

Using a GAKUSHIN Type Friction Resistance Test Machine (Daiei Scientific Exact Machines Mfg. Co., Ltd.), a surface of an artificial leather obtained in the present invention was rubbed 100 times with a cotton fabric impregnated with toluene, ethyl acetate or ethyl alcohol under a load of 500 g. The change in the appearance of the rubbed surface was evaluated by the naked eye and grading was as follows:

| | excellent | change of appearance scarcely occurred |
|---|---|---|
| | good | change of appearance slightly occurred |
| | poor | change of appearance considerably occurred |

5. Resistance to Gases 5-1. Nitrogen Oxide Gas

A polyurethane film obtained as described for Test 1 was exposed to nitrogen oxide gas in accordance with JIS-L-0855. The yellowness of the exposed film was evaluated by the naked eye.

5-2. Sunlight

A polyurethane film obtained as described for Test 1 was exposed to sunlight for 20 fine days (during from May to September) on a 45° inclined plate facing south. The yellowness of the exposed film was evaluated by the naked eye. Preferred values for both tests are not less than 3. Grading was as follows:

| | 5 | almost no yellow color |
|---|---|---|
| | 4 | slight yellow color |
| | 3 | appreciable yellow color |
| | 2 | considerable yellow color |
| | 1 | exorbitant yellow color |

6. Resistance to Microorganisms 6-1. Polyurethane Film

A polyurethane film (obtained as described for Test 1) fixed on a plastic plate after 10% elongation was buried in wet soil containing about 40% by weight of water at a temperature of 30° C. Resistance to microorganisms was shown as the number of days until a crack occurs in the film for the first time. A preferred value is more than 100 days.

6-2. Artificial Leather

An artificial leather obtained in accordance with the present invention was immersed in a 0.2% by weight aqueous solution of soap at 40° C. for 10 hours, and then was buried in wet soil containing about 40% by weight of water at a temperature of 30° C. Resistance to microorganisms was shown as the number of days until a crack occurs in the leather for the first time. A preferred value is more than 100 days.

7. Cold Resistance

An artificial leather obtained in the present invention was bent 100,000 cycles at a temperature of −10° C. in accordance with JIS-K-6505. The degree of collapse of the leather was evaluated by the naked eye. The preferred value is not less than 3. Grading was as follows:

| | 5 | collapse scarcely occurred |
|---|---|---|
| | 4 | collapse slightly occurred |
| | 3 | collapse appreciably occurred |
| | 2 | collapse considerably occurred |
| | 1 | collapse greatly occurred |

8. Average Diameter of Particles

A polyurethane slurry obtained in accordance with the present invention was transferred to a test flask equipped with a stirrer while keeping the temperature when the slurry polymerization was completed, and was then diluted by the solvent used in the polymerization with stirring to form a polyurethane slurry containing 5% by weight of the polyurethane. After cooling the diluted slurry to 25° C. with stirring, a drop of the slurry was placed on a transparent glass plate and covered by a cover glass. The drop was observed with an optical microscope at a magnification of 100 ×, and a microphotograph of the drop taken. The diameter of each particles in a 4 cm² area of the microphotograph was measured. The average diameter of the particles represents the mean value of the measured diameters.

9. Weight Ratio of Particles

The 5% polyurethane slurry (Wo g) obtained as described for Test 8 was taken into a centrifugal sedimentation tube. At 25° C., the slurry in the tube was allowed to sediment centrifugally for 15 minutes at 1500 rpm. The supernatant liquid was removed by decantation, and the remaining polyurethane particle part dried at 105° C. to a constant weight and weighed (Ws g).

A part of the same slurry was taken into a weighing bottle at the time of taking the slurry into the sedimentation tube and evaporated to dryness. The concentration of polyurethane ($\alpha$%) contained in the slurry was measured.

The weight ratio of the particles in the polyurethane slurry was calculated by the following formula:

$$\text{Weight Ratio of Particles (\% by weight)} = \frac{Ws}{Wo \times \alpha} \times 10^4$$

10. Intrinsic Viscosity($\eta$)

Intrinsic viscosity of the polyurethane obtained in accordance with the present invention was measured at 30° C. in dimethylformamide.

11. Permeability

A non-woven fabric having a 0.25 g/cm² apparent density which was 1 mm thick was prepared by needle punching a web consisting of polyethylene terephthalate staples (1.2 denier; 51 mm length) at a density of 800 counts/cm² and then heat-pressing at 130° C. and 0.2 kg/cm² for 90 seconds.

The fabric was floated on a polyurethane slurry (20% by weight) obtained in accordance with the present invention. The rate of the slurry permeating through the fabric was measured and graded as follows:

| | | |
|---|---|---|
| excellent | the rate is fast (less than about 10 seconds) | |
| good | the rate is medium (from about 11 to about 30 seconds) | |
| poor | the rate is slow (more than 60 seconds) | |

12. Appearance of Film Surface

A 1 mm thick film of polyurethane was prepared by coating a polyurethane slurry (20% by weight) obtained in accordance with the present invention on a glass plate, immersing the glass plate with the film thereon in methanol at 25° C. for 20 minutes to coagulate the polyurethane and drying the film at 65° C. for 20 minutes. The appearance of the polyurethane film surface was observed using an optical microscope at a magnification of 100 X. Grading was as follows:

| | |
|---|---|
| excellent | fine, even surface |
| good | almost even surface |
| poor | uneven surface |

13. Heat Deformation Temperature

A test piece having a length of 2 cm and a width of 5 mm was cut out from a polyurethane film obtained as described for Test 1. The film was fixed on a stand by clipping one end (0.5 cm) of the piece, and a load of one tenth of g/m² of the piece was hung on the other end (0.5 cm) of the piece. The test piece was immersed in silicon oil, and the temperature of the silicon oil was raised at a rate of 5° C./min. The relation between temperature and strain was recorded, and the temperature at which the test piece began to suddently flow was designated as the heat deformation temperature. The preferred temperature is more than 145° C.

14. Repulsive Resilience

A test piece having a length of 9 cm and a width of 1 cm was cut out from a polyurethane film obtained as described for Test 1. The test piece was folded into a rectangular form 4.5 cm long and 1 cm wide and was subjected to a load of 5 kg/cm² for one hour. After releasing the load, the opening angle ($\theta°$) of the folded piece (the angle formed between the two rectangular planes) was measured. Repulsive resilience was calculated by the following formula:

$$\text{Repulsive Resilience} = \frac{\theta}{180} \times 100(\%)$$

Larger values show a greater repulsive resilience. The preferred repulsive resilience is from 60% to 80%.

15. Practical Durability

A pair of sport shoes was conventionally prepared from artificial leathers obtained in accordance with the present invention. The pair of sport shoes was worn for 3 months with weekly washing with an aqueous solution containing 0.5% by weight soap for 30 minutes at 40° C.

The degree of collapse of the shoes surface was evaluated by the naked eye. Grading was as follows:

| | |
|---|---|
| 5 | collapse scarcely occurred |
| 4 | collapse slightly occurred |
| 3 | collapse appreciably occurred |
| 2 | collapse considerably occurred |
| 1 | collapse greatly occurred |

16. pH

A mixture of 1 g of a diol compound (component (D)) and 99 g of pure water was heated while stirring, boiled for 5 minutes and then cooled while stirring to room temperature (about 20° C.). After removing precipitated foreign matter from the obtained solution by filtration using filter paper, the pH of the filtrate was measured using a glass electrode in JIS-Z-3802-7 at room temperature.

EXAMPLE 1

A reactor fitted with a stirrer and a condenser was charged with 475 g of polybutylene adipate having an average molecular weight of 1,720 (component (A)), 75 g of an adduct of ethylene oxide (2.23 mol adduct) and 2,2-bis(4-hydroxyphenyl) propane having an average molecular weight of 326 (pH=6.8) (component (D)), 365.7 g of diphenylmethane-4,4'-diisocyanate (component (C)), 229 g of dimethylformamide (solvent) and 0.01 g of triethylene diamine (catalyst), and the system reacted for 100 minutes at a temperature of 40° C. under normal atmospheric pressure to prepare a prepolymer. 84.3 g of 1,4-butane diol (component (B)) and 2 g of triethylene diamine (catalyst) were added to the prepolymer solution, and the mixture reacted for 200 minutes at a temperature of 40° C. under normal atmospheric pressure while gradually adding 3,971 g of dimethylformamide to obtain a polyurethane solution containing 20% by weight of polyurethane. The obtained polyurethane solution was diluted with dimethylformamide to a solids concentration of 10% by weight.

An artificial leather was then prepared in the following manner. A non-woven fabric 1.2 mm thick having a 0.25 g/cm$^3$ apparent density which consisted of polyethylene terephthalate staples (1.2 denier; 51 mm length) was immersed in the polyurethane solution (10% by weight) and then squeezed by nip rolls to adjust the amount of the solution impregnated to 1,800 g/m$^2$. The impregnated non-woven fabric was then immersed in water at 40° C. for 30 minutes to coagulate the polyurethane, and then dried at 110° C. for 10 minutes.

The above-mentioned polyurethane solution was then coated on a surface of the obtained fabric using a knife coater in an amount of 200 g/m$^2$ (calculated in terms of polyurethane). The coated fabric was immersed in water at 40° C. for 1 hour to coagulate the polyurethane and form a porous surface (0.5 mm thick), and then dried at 110° C. for 10 minutes.

The above-mentioned polyurethane solution was then coated on the resulting porous surface of the fabric using a gravure roller to form a 15$\mu$ thick surface finishing layer, and the obtained artificial leather was dried at 110° C. for 10 minutes.

The result of testing the physical and chemical properties of this polyurethane were as shown in Table III below.

EXAMPLES 2-14

By the same procedure as in Example 1, a polyurethane was produced by reacting a long-chain diol, a chain extender, an organic diisocyanate and a diol compound as disclosed in Table I. The results of testing the physical and chemical properties of the obtained polyurethanes were as shown in Table II below.

COMPARATIVE EXAMPLES 1-9

By the same procedure as in Example 1, a polyurethane was produced by reacting a long-chain diol, a chain-extender, an organic diisocyanate and a diol compound as disclosed in Table II. The results of testing the physical and chemical properties of the obtained polyurethanes were as shown in Table IV below.

TABLE I

| | Long-chain diol (A) | | | | | Diol compound (D) | | Nitrogen atom content in the polyurethane (Wt %) | (D) component content in the polyurethane (Wt %) |
|---|---|---|---|---|---|---|---|---|---|
| | Polyester diol | Polyether diol | Polyester diol/ Polyether diol (Weight ratio) | Chain-extender (B) | Organic diisocyanate (C) | Diol compound | pH | | |
| Ex. | (1)*1 | (2)*2 | (3) | (4)*3 | (5)*4 | (6)*5 | (7) | (8) | (9) |
| 1 | PBA (MW 1720) 475g | — | — | BG 84.3g | MDI 365.7g | BPA . EO 75g (MW 326) | 6.8 | 4.1 | 7.5 |
| 2 | PEA (MW 1750) 483.6g | — | — | BG 82.7g | MDI 358.7g | HBPA . EO 75g (MW 340) | 6.6 | 40.0 | 7.5 |
| 3 | PBA (MW 1720) 445g | — | — | BG 85.9g | MDI 369.1g | BPA . PO 100g (MW 410) | 6.4 | 4.1 | 10.0 |
| 4 | PBA (MW 2500) 424.6g | — | — | BG 80.3g | MDI 345.1g | HBPA . PO 150g (MW 500) | 7.3 | 3.9 | 15.0 |
| Ex. | (1) | (2) | (3) | (4) | (5) | (6) | (7) | (8) | (9) |
| 5 | PEA (MW 1750) 495.2g | — | — | EG 67.6g | MDI 387.2g | BPA . EO 50g (MW 326) | 6.8 | 4.3 | 5.0 |
| 6 | PEA (MW 1750) 466.7g | — | — | BG 105.7g | MDI 397.6g | HBPA 30g (MW 240) | 7.0 | 4.5 | 3.0 |
| 7 | PBA (MW 1700) 192g | PTG (MW 1700) 288g | 40/60 | BG 85g | MDI 365g | BPA . EO 70g (MW 326) | 6.2 | 4.1 | 7 |
| 8 | PBA (MW 1700) 221.5g | PTG (MW 1700) 221.5g | 50/50 | BG 86.3g | MDI 370.7g | BPA . PO 100g (MW 410) | 6.4 | 4.2 | 10 |
| 9 | PEA (MW 2500) 212.3g | PTG (MW 2500) 212.3g | 50/50 | BG 80.3g | MDI 345.1g | HBPA . PO 150g (MW 500) | 7.3 | 3.9 | 15 |
| 10 | PBA (MW 1700) 384g | PTG (MW 1700) 96g | 80/20 | BG 85g | MDI 365g | BPA . EO 70g (MW 326) | 6.8 | 4.1 | 7 |
| 11 | — | PTG (MW 1700) 443g | — | BG 86.3g | MDI 370.7g | BPA . PO 100g (MW 410) | 6.4 | 4.2 | 10 |
| 12 | — | PTG (MW 1700) 489.8g | — | EG 68.4g | MDI 391.8g | BPA . EO 50g (MW 326) | 5.5 | 4.4 | 5.0 |
| 13 | PBA (MW 1700) 243.8g | — | — | BG 141.8g | MDI 514.4g | BPA . EO 100g (MW 326) | 6.2 | 5.8 | 10.0 |
| | PBA | | | BG | MDI | HBPA . PO | | | |

TABLE I-continued

| | Long-chain diol (A) | | | | | Diol compound (D) | | Nitrogen atom content in the polyurethane (Wt %) | (D) component content in the polyurethane (Wt %) |
|---|---|---|---|---|---|---|---|---|---|
| | Polyester diol | Polyether diol | Polyester diol/ Polyether diol (Weight ratio) | Chain-extender (B) | Organic diisocyanate (C) | Diol compound | pH | | |
| 14 | (MW 1700) 222.3g | — | — | 135.7g | 492g | 150g (MW 500) | 6.8 | 5.5 | 15.0 |

TABLE II

| | Long-chain diol (A) | | | | | Diol compound (D) | | Nitrogen atom content in the polyurethane (Wt %) | (D) component content in the polyurethane (Wt %) |
|---|---|---|---|---|---|---|---|---|---|
| | Polyester diol | Polyether diol | Polyester diol/ Polyether diol (Weight ratio) | Chain-extender (B) | Organic diisocyanate (C) | Diol compound | pH | | |
| Comparative Ex. | (1)*1 | (2)*2 | (3) | (4)*3 | (5)*4 | (6)*5 | (7) | (8) | (9) |
| 1 | PBA (MW 1720) 541.3 g | — | — | BG 99.1 g | MDI 359.6 g | — | — | 4.0 | 0 |
| 2 | PBA (MW 2500) 684.9g | — | — | BG 56.5 g | MDI 238.6 g | HBPA . PO 20 g (MW 500) | 7.3 | 2.7 | 2.0 |
| 3 | PBA (MW 1720) 257.2g | — | — | BG 101 g | MDI 461.8 g | BPA . EO 180 g (MW 326) | 6.8 | 5.2 | 18.0 |
| 4 | PBA (MW 1700) 269.2 g | PTG (MW 1700) 2609.2 g | 50/50 | BG 99.8 g | MDI 361.8 g | — | — | 4.1 | 0 |
| Comparative Ex. | (1) | (2) | (3) | (4) | (5) | (6) | (7) | (8) | (9) |
| 5 | PBA (MW 2500) 410.9 g | PTG (MW 2500) 274 g | 60/40 | BG 56.5 g | MDI 236.6 g | HBPA . PO 20 g (MW 500) | 7.3 | 2.7 | 2.0 |
| 6 | PBA (MW 1700) 179.5 g | PTG (MW 1700) 76.9 g | 70/30 | BG 101.2 g | MDI 462.5 g | BPA . EO 180 g (MW 326) | 6.8 | 5.2 | 18.0 |
| 7 | — | PTG (MW 2500) 684.9 g | — | BG 56.5 g | MDI 238.6 g | HBPA . PO 20 g (MW 500) | 7.3 | 2.7 | 2.0 |
| 8 | — | PTG (MW 1700) 256.3 g | — | BG 101.2 g | MDI 462.5 g | HBPA . EO 180 g (MW 326) | 6.6 | 5.2 | 18.0 |
| 9 | — | PTG (MW 1700) 124.4 g | — | BG 140.7 g | MDI 554.9 g | BPA . EO 180 g (MW 326) | 6.8 | 6.2 | 18.0 |

Footnotes from Tables I, II and V
*1 PBA: polybutylene adipate
PEA: polyethylene adipate
PCL: polycaprolactone diol
PHA: polyhexamethylene adipate

*2 PTG: polytetramethyleneether glycol
PEG: polyethylene glycol

*3 BG: 1,4-butane diol
EG: ethylene glycol

*4 MDI: diphenylmethane-4,4'-diisocyanate
XDI: p-xylylene diisocyanate

*5 BPA . EO: an adduct of bisphenol A and ethylene oxide
HBPA: 2,2-bis(4-hydroxycyclohexyl)propane
BPA . PO: an adduct of bisphenol A and propylene oxide
HBPA . EO: an adduct of 2,2-bis(4-hydroxycyclohexyl) propane and ethylene oxide

TABLE II-continued

| | Long-chain diol (A) | | | | | | Nitrogen atom content in the poly- urethane (Wt %) | (D) component content in the poly- urethane (Wt %) |
|---|---|---|---|---|---|---|---|---|
| Polyester diol | Polyether diol | Polyester diol/ Polyether diol (Weight ratio) | Chain- extender (B) | Organic diisocyanate (C) | Diol com- pound (D) Diol compound | pH | | |

HBPA . PO: an adduct of 2,2-bis(4-hydroxycyclohexyl) propane and propylene oxide
BrBPA . EO: an adduct of 2,2-bis(4-hydroxy-3-bromophenyl) propane and ethylene oxide

TABLE III

| | Elasticity | | | Strength after raying for 48 hours (kg/mm²) (4) | Fric- tional coeffi- cient (5) | Resist- ance to organic solvents (6) | Resist- ance to nitrogen oxide gas (7) | Resistance to microorganisms | | Cold resist- ance (10) |
|---|---|---|---|---|---|---|---|---|---|---|
| Ex- ample | Tensile stress at 5% (kg/mm²) (1) | Tensile stress at 20% (kg/mm²) (2) | Elonga- tion recovery at 50% (%) (3) | | | | | Poly- urethane film (days) (8) | Artifi- cial leather (days) (9) | |
| 1 | 0.29 | 0.56 | 80 | 2.6 | 0.66 | good | 4 | 200 | 200 | 4–5 |
| 2 | 0.27 | 0.53 | 82 | 2.6 | 0.71 | good | 4 | 200 | 200 | 4–5 |
| 3 | 0.35 | 0.68 | 77 | 3.2 | 0.55 | good | 5 | 300 | 300 | 4–5 |
| 4 | 0.45 | 0.86 | 60 | 3.5 | 0.43 | good | 5 | 300 | 300 | 4–5 |
| 5 | 0.25 | 0.49 | 83 | 2.8 | 0.77 | good | 4 | 200 | 200 | 4–5 |
| 6 | 0.37 | 0.74 | 85 | 2.6 | 0.52 | good | 3 | 100 | 100 | 4–5 |
| 7 | 0.25 | 0.49 | 83 | 2.5 | 0.78 | good | 4 | more than 300 | more than 300 | 4–5 |
| 8 | 0.34 | 0.68 | 78 | 3.1 | 0.56 | good | 5 | more than 300 | more than 300 | 4–5 |
| 9 | 0.44 | 0.86 | 62 | 3.4 | 0.44 | good | 5 | more than 300 | more than 300 | 4–5 |
| 10 | 0.27 | 0.53 | 81 | 2.9 | 0.72 | good | 4 | 150 | 150 | 4–5 |
| 11 | 0.32 | 0.63 | 80 | 2.9 | 0.60 | good | 5 | 300 | 300 | 5 |
| 12 | 0.23 | 0.45 | 85 | 2.5 | 0.83 | good | 4 | 300 | 300 | 5 |
| 13 | 2.40 | 3.84 | 56 | 3.1 | 0.18 | excel- lent | 5 | 300 | 300 | 3 |
| 14 | 2.80 | 4.48 | 54 | 3.5 | 0.17 | excel- lent | 5 | 300 | 300 | 3 |

TABLE IV

| | Elasticity | | | Strength after raying for 48 hours (kg/mm²) (4) | Fric- tional coeffi- cient (5) | Resist- ance to organic solvents (6) | Resist- ance to nitrogen oxide gas (7) | Resistance to microorganisms | | Cold resist- ance (10) |
|---|---|---|---|---|---|---|---|---|---|---|
| Com- para- tive Ex- ample | Tensile stress at 5% (kg/mm²) (1) | Tensile stress at 20% (kg/mm²) (2) | Elonga- tion recovery at 50% (%) (3) | | | | | Poly- urethane film (days) (8) | Artifi- cial leather (days) (9) | |
| 1 | 0.26 | 0.51 | 92 | 2.0 | 0.77 | good | 1 | 20 | 15 | 4–5 |
| 2 | 0.08 | 0.16 | 91 | 1.8 | more than 1.0 | poor | 2 | 30 | 20 | 4–5 |
| 3 | 3.30 | 3.10 | 47 | 3.6 | 0.12 | excel- lent | 4 | 300 | 300 | 1 |
| 4 | 0.25 | 0.49 | 93 | 1.1 | 0.80 | good | 1 | 20 | 19 | 4–5 |
| 5 | 0.08 | 0.16 | 92 | 2.1 | more than 1.0 | poor | 2 | 40 | 35 | 4–5 |
| 6 | 3.20 | 3.00 | 49 | 3.6 | 0.12 | excel- lent | 4 | 300 | 300 | 1 |
| 7 | 0.07 | 0.14 | 92 | 1.8 | more than 1.0 | poor | 2 | 300 | 300 | 4–5 |
| 8 | 3.03 | 2.90 | 52 | 3.0 | 0.13 | excel- lent | 4 | 300 | 300 | 1 |
| 9 | 3.05 | 2.95 | 48 | 3.2 | 0.13 | excel- lent | 3 | 300 | 300 | 1 |

The polyurethanes obtained in accordance with the present invention (Examples 1–14) had moderate elasticity suitable for artificial leathers and excellent properties, such as resistance to nitrogen oxide gas, microorganisms and cold.

When a mixture of a polyester diol and a polyether diol was used as the long-chain diol component (Examples 7–10), the obtained polyurethane had, in particular, excellent resistance to microorganisms.

When a polyether diol was used as the long-chain diol component (Examples 11 and 12), the obtained polyurethane had, in particular, excellent resistance to cold. A polyurethane having a nitrogen atom content of from 4.7% to 6.0% by weight (Examples 13 and 14) had, in particular, excellent resistance to organic solvents and a low frictional coefficient, and was suitable for a surface finishing polymer of an artificial leather.

The polyurethanes in the Comparative Examples which were out of scope of the present invention had at least one disadvantage. The polyurethane which did not contain component (D) (Comparative Examples 1 and 4) had poor resistances to nitrogen oxide gas and microorganisms. The polyurethane which had a nitrogen atom content of less than 3% by weight and contained component (D) in an amount of less than 3% by weight (Comparative Examplees 2, 5 and 7) had too low an elastic modulus, and hence was not suitable for artificial leathers. The polyurethane which had a nitrogen atom content of more than 6% by weight and/or which had a component (D) content of more than 15% by weight (Comparative Examples 3, 6, 8 and 9) had too high an elastic modulus and a poor resistance to cold.

EXAMPLE 15

A reactor fitted with a stirrer and a condenser was charged with 723 g of polybutylene adipate having an average molecular weight of 1,730 (component (A)), 162 g of polytetramethyleneether glycol having an average weight of 1,550 (component (A)), 156 g of an adduct of 2,2-bis(4-hydroxyphenyl)propane and ethylene oxide having an average molecular weight of 326 (pH=6.8) (component (D)), 735 g of diphenylmethane-4,4'-diisocyanate (component (C)), 0.05 g of triethylene diamine (catalyst) and 444 g of methyl ethyl ketone (solvent), and the system reacted for 80 minutes at a temperature of 45° C. under normal atmospheric pressure to prepare a prepolymer. Over the course of the reaction the temperature gradually rose up to 58° C. 171 g of 1,4-butane diol (component (B)), 1,500 g of methyl ethyl ketone and 4 g of triethylene diamine were then added to the prepolymer solution, and the mixture reacted for 30 minutes at a temperature of between 70° C. and 75° C. under normal atmospheric pressure to provide a highly viscous, milky paste. After gradually adding 5,844 g of methyl ethyl ketone to the paste, the reaction was continued for 150 minutes at a temperature of 73° C. under normal atmospheric pressure to obtain a bluish milky polyurethane slurry containing 20% by weight polyurethane and having a viscosity of 650 cps measured at 70° C.

An artificial leather was prepared in the following manner. With stirring by a homomixer, 250 g of water was added dropwise to 1,000 g of the polyurethane slurry over the course of 30 minutes. The resulting mixed slurry had a polyurethane concentration of 16% by weight and a viscosity of 40° C. of 3,000 cps. A 1.2 mm thick non-woven fabric having an apparent density of 0.25 g/cm$^3$ which consists of polyethylene terephthalate staples (1.2 denier; 51 mm length) was immersed in the mixed slurry (16% by weight) and then squeezed by nip rolls to adjust the amount of the slurry impregnated therein to 1,125 g/m$^2$. The impregnated fabric was passed through methanol at 35° C. for 30 seconds, then dried at 60° C. for 10 minutes and further dried at 100° C. for 10 minutes.

The above-obtained mixed slurry was coated on the surface of the obtained fabric using a knife coater in an amount of 200 g/m$^2$ (calculated in terms of polyurethane). The coated fabric was passed through methanol at 35° C. for 30 seconds, then dried at 60° C. for 10 minutes and further dried at 100° C. for 10 minutes to form a porous surface (0.5 mm thick).

The above obtained mixed slurry was coated on the porous surface of the fabric using a gravure roller to form a 15μ thick surface finishing layer, and the obtained artificial leather was dried at 110° C. for 10 minutes.

The results of testing the physical and chemical properties of the obtained polyurethane slurry and polyurethane were as shown in Table VI below.

EXAMPLES 16 AND 17, COMPARATIVE EXAMPLES 10 and 11

By the same procedure as in Example 15, a polyurethane slurry was produced by reacting a long-chain diol, a chain-extender, an organic diisocyanate and a diol compound as disclosed in Table V. The results of testing the physical and chemical properties of the obtained polyurethane slurry and polyurethane were as shown in Table VI below.

EXAMPLE 18

A reactor fillted with a stirrer and a condenser was charged with 577 g of polyethylene adipate having an average molecular weight of 1,700 (component (A)), 128 g of polyethylene glycol having an average molecular weight of 1,540 (component (A)), 321 g of an adduct of 2,2-bis (4-hydroxycyclohexyl)propane and propylene oxide having an average molecular weight of 556 (pH=6.6) (component (D)), 888 g of diphenylmethane-4,4'-diisocyanate (component (C)), 0.08 g of triethylene diamine (catalyst) and 479 g of a mixed solvent of methyl ethyl ketone and tetrahydrofuran (weight ratio of 90:10), and the system reacted for 80 minutes at a temperature of between 55° C. and 66° C. under normal atmospheric pressure to prepare a prepolymer. 155 g of ethylene glycol (component (B)), 1,590 g of the mixed solvent and 4.8 g of triethylene diamine were added to the prepolymer solution, and the mixture reacted for 20 minutes under normal atmospheric pressure, the temperature raising from 55° C. to 70° C. over the course of the reaction. Thereafter, while gradually adding 6,207 g of the mixed solvent to the mixture, the reaction was continued for 130 minutes at a temperature of between 66° C. and 68° C. under normal atmospheric pressure to obtain a polyurethane slurry containing 20% by weight of polyurethane. An artificial leather was then prepared as described in Example 15. The results of testing the physical and chemical properties of the obtained polyurethane slurry and polyurethane were as shown in Table VI below.

EXAMPLES 19–21

By the same procedure as in Example 18, a polyurethane slurry was produced by reacting a long-chain diol, a chain-extender, an organic diisocyanate and a diol compound as disclosed in Table V. The results of testing the physical and chemical properties of the obtained polyurethane slurry and polyurethane were as shown in Table VI below.

In the following Tables the abbreviations used are the same as those used in earlier Tables I and II.

TABLE V

| Example | Long-chain diol (A) Polyester diol (1) *1 | Polyether diol (2) *2 | Polyester diol/ Polyether diol (Weight ratio) (3) | Chain-extender (B) (4) *3 | Organic diisocyanate (5) *4 | Diol compound (D) Diol compound (6) *5 | pH (7) | Nitrogen atom content in the polyurethane (Wt %) (8) | (D) component content in the polyurethane (Wt %) (9) |
|---|---|---|---|---|---|---|---|---|---|
| 15 | PBA (MW 1730) 723 g | PTG (MW 1550) 162 g | 82/18 | BG 171 g | MDI 735 g | BPA . EO 156 g (MW 326 g) | 6.8 | 4.23 | 8.0 |
| 16 | PBA (MW 1730) 976 g | PTG (MW 1550) 219 g | 82/18 | BG 225 g | MDI 545 g | BPA . EO 96 g (MW 326) | 6.8 | 4.14 | 4.0 |
| 17 | PBA (MW 1730) 437 g | PTG (MW 1550) 98 g | 82/18 | BG 153 g | MDI 684 g | BPA . EO 223 g (MW 326) | 6.8 | 4.80 | 14.0 |
| 18 | PEA (MW 1700) 577 g | PEG (MW 1540) 128 g | 82/18 | EG 155 g | MDI 888 g | HBPA . PO 321 g (MW 556) | 6.6 | 4.80 | 15.0 |

| Example | (1) | (2) | (3) | (4) | (5) | (6) | (7) | (8) | (9) |
|---|---|---|---|---|---|---|---|---|---|
| 19 | PCL (MW 1730) 1000 g | PEG (MW 1540) 131 g | 88/12 | EG 167 g | MDI 722 g | BrBPA . EO 164 g (MW 486) | 6.7 | 3.70 | 7.5 |
| 20 | PCL (MW 1730) 1048 g | PEG (MW 1540) 126 g | 89/11 | EG 158g | MDI 696g | HBPA 74g (MW 236) | 6.4 | 3.71 | 3.5 |
| 21 | PHA (MW 1750) 967 g | PEG (MW 1540) 129 g | 88/12 | EG 180 g | XDI 572 g | BPA . EO 119 g (MW 326) | 6.8 | 3.25 | 5.5 |
| Comparative Example 10 | PBA (MW 1730) 723 g | PTG (MW 1550) 162 g | 82/18 | BG 171 g | MDI 735 g | BPA . EO 156 g (MW 326) | 7.8 | 4.25 | 8.0 |
| Comparative Example 11 | PBA (MW 1730) 723 g | PTG (MW 1550) 162 g | 82/18 | BGT 171 g | MDI 735 g | BPA . EO 156 g (MW 326) | 4.6 | 4.25 | 8.0 |

TABLE VI

| Example | Properties of polyurethane slurry | | | | Properties of polyurethane | | | | | | | | |
|---|---|---|---|---|---|---|---|---|---|---|---|---|---|
| | Weight ratio of articles (Wt %) (1) | Average diameter of particles (μ) (2) | Permeability (3) | Appearance of film surface (4) | [η] (5) | Tensile stress at 5% (kg/mm²) (6) | Elongation recovery at 50% (%) (7) | Heat deformation temperature (°C.) (8) | Resistance to microorganisms (Artificial leather) (9) | Resistance to gases Nitrogen oxide (10) | Sunlight (11) | Repulsive resilience (%) (12) | Cold resistance (13) | Practical durability (14) |
| 15 | 38 | 5 | excellent | excellent | 0.89 | 0.33 | 80 | 155 | more than 6 months | 5 | 4 | 72 | 5 | 5 |
| 16 | 42 | 15 | good | good | 0.88 | 0.30 | 84 | 158 | more than 6 months | 5 | 4 | 75 | 5 | 5 |
| 17 | 44 | 8 | excellent | excellent | 0.88 | 0.38 | 76 | 154 | more than 6 months | 5 | 5 | 70 | 4 | 5 |
| 18 | 25 | 2 | excellent | good | 0.90 | 0.35 | 78 | 153 | more than 6 months | 5 | 4 | 70 | 4 | 5 |
| 19 | 35 | 4 | excellent | good | 0.86 | 0.31 | 84 | 153 | more than | 5 | 4 | 75 | 5 | 5 |

TABLE VI-continued

| | Properties of polyurethane slurry | | | | Properties of polyurethane | | | | | | | | | |
|---|---|---|---|---|---|---|---|---|---|---|---|---|---|---|
| Example | Weight ratio of articles (Wt %) (1) | Average diameter of particles (μ) (2) | Permeability (3) | Appearance of film surface (4) | $[\eta]$ (5) | Tensile stress at 5% (kg/mm$^2$) (6) | Elongation recovery at 50% (%) (7) | Heat deformation temperature (°C.) (8) | Resistance to microorganisms (Artificial leather) (9) | Resistance to gases | | Repulsive resilience (%) (12) | Cold resistance (13) | Practical durability (14) |
| | | | | | | | | | | Nitrogen oxide (10) | Sunlight (11) | | | |
| 20 | 48 | 10 | excellent | good | 0.86 | 0.30 | 85 | 153 | 6 months more than | 5 | 4 | 76 | 5 | 5 |
| 21 | 12 | 0.3 | excellent | good | 0.92 | 0.25 | 86 | 152 | 6 months more than | 5 | 5 | 78 | 5 | 5 |
| Comparative Example | (1) | (2) | (3) | (4) | (5) | (6) | (7) | (8) | (9) | (10) | (11) | (12) | (13) | (14) |
| 10 | 38 | 8 | poor | poor | 0.78 | 0.33 | 81 | 155 | more than 6 months | 5 | 4 | 78 | 5 | 5 |
| 11 | 38 | 5 | excellent | poor | 0.58 | 0.33 | 79 | 134 | 4 months | 5 | 3 | 72 | 4 | 4 |

Since the polyurethane slurries obtained in accordance with the present invention (Examples 15-21) had good permeability and a good film surface appearance, they were highly suitable for producing artificial leathers. In addition, the polyurethanes in Examples 15-21 had moderate elasticity, high heat deformation temperature, excellent resistance to microorganisms, gases and cold, good repulsive resilience and practical durability.

The polyurethane slurry in Comparative Example 10, which was obtained by using a diol compound (component (D)) having a pH of more than about 7.5 (out of the scope of the present invention), was a highly viscous fluid having poor permeability so that the polyurethane slurry was not suitable for producing artificial leathers. The polyurethane slurry in Comparative Example 11, which was obtained by using a diol compound having a pH of less than about 5.0 (out of the scope of the present invention), had a poor film surface appearance so that the polyurethane slurry was not suitable for producing artificial leathers. In addition, the polyurethane was poor in resistance to microorganisms and had a poor heat deformation temperature.

While the invention has been described in detail and with reference to specific embodiments thereof, it will be apparent to one skilled in the art that various changes and modifications can be made therein without departing from the spirit and scope thereof.

What is claimed is:

1. A linear thermoplastic polyurethane useful for forming a microporous artificial leather of moderate elasticity consisting essentially of the polymerization product of:

(A) a long-chain diol having a molecular weight of from about 800 to about 4,000;
   (B) a difunctional active hydrogen-containing chain-extender having a molecular weight of from about 50 to about 150;
   (C) an organic diisocyanate; and
   (D) a diol compound represented by formula (I):

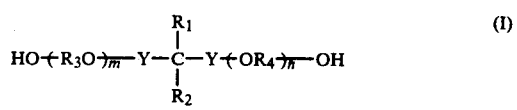

wherein $R_1$ and $R_2$, which may be the same or different, are hydrogen or an alkyl radical having from 1 to 3 carbon atoms, $R_3$ and $R_4$, which may be the same or different, are an alkylene radical having from 2 to 4 carbon atoms; Y is a bivalent radical selected from the group consisting of

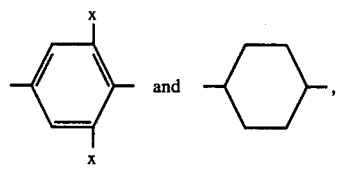

wherein x is hydrogen, chlorine, bromine or a methyl radical; m and n are positive integers satisfying the formula $2 \leq m+n \leq 10$ when Y is

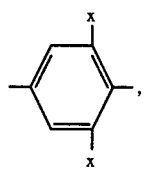

or m and n are zero or positive integers satisfying the formula $0 \leq m+n \leq 10$ when Y is

further wherein said component (D) comprises from about 5% to about 15% by weight of the polyurethane, and the nitrogen atoms derived from said component (C) comprise from about 3% to about 6% by weight of the polyurethane, wherein the thermoplastic polyurethane has a tensile stress at 5% elongation of from 0.1 to 0.5 kg/m², a tensile stress at 20% elongation of from 0.2 to 1.0 kg/m² and an elongation recovery at 50% elongation of from 50% to 87% at a temperature of 20° C., measured in the form of a polyurethane film.

2. The thermoplastic polyurethane of claim 1, wherein the diol compound is represented by formula (II):

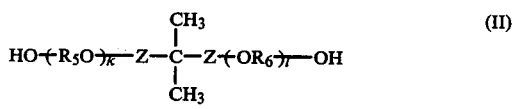

wherein $R_5$ and $R_6$, which are the same, are a member selected from the group consisting of —$CH_2.CH_2$— and $$-CH_2.\overset{CH_3}{\underset{|}{CH}}-;$$

Z is a member selected from the group consisting of

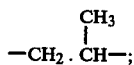

k and l are 1 or 2 when Z is

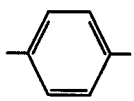

and k and l are 0, 1 or 2 when Z is

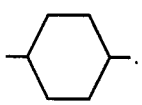

3. The thermoplastic polyurethane of claim 1, wherein the long-chain diol is a mixture of from about 90% to about 30% by weight polyester diol and from about 10% to about 70% by weight polyether diol.

4. The thermoplastic polyurethane of claim 1, wherein the long-chain diol contains one or more polyether diols in an amount of more than about 70% by weight of the long-chain diol.

5. The thermoplastic polyurethane of claim 1, wherein the nitrogen atoms derived from the organic diisocyanate comprise from 4.7% to 6.0% by weight of the polyurethane.

6. The thermoplastic polyurethane of claim 1, wherein the organic diisocyanage is a member selected from the group consisting of p-phenylene diisocyanate, diphenylmethane-4,4'-diisocyanate, p-xylene diisocyanate and a mixture thereof.

7. A process for the preparation of a linear thermoplastic polyurethane solution or slurry useful for forming a microporous artificial leather having moderate elasticity which comprises reacting under solution-forming or slurry-forming conditions a mixture consisting essentially of:

(A) a long-chain diol having a molecular weight of from about 800 to about 4,000;

(D) a difunctional active hydrogen containing chain-extender having a molecular weight of from about 50 to about 150;

(C) an organic diisocyanate; and (D) a diol compound which comprises from about 5% to about 15% by weight of the polyurethane, wherein the pH of an aqueous solution containing 1% by weight of the diol compound is from about 5.0 to about 7.5 at room temperature, which diol compound is represented by formula (I):

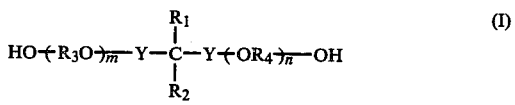

wherein $R_1$ and $R_2$, which may be the same or different, are hydrogen or an alkyl radical having from 1 to 3 carbon atoms; $R_3$ and $R_4$, which may be the same or different, are an alkylene radical having from 2 to 4 carbon atoms; Y is a bivalent radical selected from the group consisting of

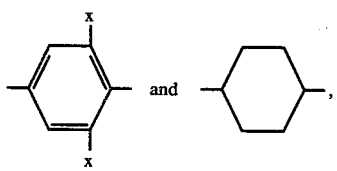

wherein x is hydrogen, chlorine, bromine or a methyl radical; m and n are positive integers satisfying the formula $2 \leq m+n \leq 10$ when Y is

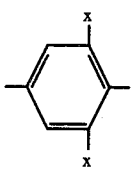

and m and n are zero or positive integers satisfying the formula $0 \leq m+n \leq 10$ when Y is

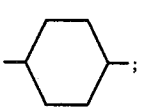

wherein the ratio of the total of (components (A), (B) and (C)) to (component (D)) is from 95:5 to 85:15 and where the amount of component (C) is such as to provide a nitrogen atom content derived from component (C) of from about 3% to about 6% by weight of the polyurethane.

8. The process of claim 7, wherein the diol compound is represented by formula (II):

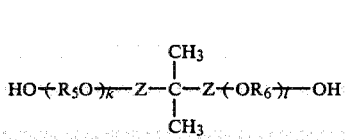

wherein $R_5$ and $R_6$ are the same and are a member selected from the group consisting of —$CH_2.CH_2$— and

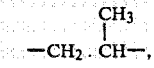

Z is a member selected from the group consisting of

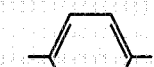 and ;

k and l are 1 or 2 when Z is

and k and l are 0, 1 or 2 when Z is

.

9. The process of claim 7, wherein the reaction is conducted by reacting components (A) and (D) with component (C) to form a polyurethane prepolymer and thereafter reacting the component (B) with the prepolymer to obtain the polyurethane.

10. The thermoplastic polyurethane of claim 1, wherein said chain-extender is a diol.

11. The thermoplastic polyurethane of claim 1, wherein said chain-extender is a diamine.

12. The thermoplastic polyurethane of claim 1, wherein said chain-extender is an alkanolamine.

13. The thermoplastic polyurethane of claim 1, wherein said chain-extender is a carbodihydrazide.

14. The process of claim 7, wherein said chain-extender is a diol.

15. The process of claim 7, wherein said chain-extender is a diamine.

16. The process of claim 7, wherein said chain-extender is an alkanolamine.

17. The process of claim 7, wherein said chain-extender is a carbodihydrazide.

* * * * *